(12) United States Patent
Moore, Jr.

(10) Patent No.: US 6,685,265 B1
(45) Date of Patent: Feb. 3, 2004

(54) SUPPLEMENTAL SEAT DEVICE FOR A BICYCLE

(76) Inventor: William G Moore, Jr., 15060-1102 Lakeside View Dr., Fort Myers, FL (US) 33919

( * ) Notice: Subject to any disclaimer, the term of this patent is extended or adjusted under 35 U.S.C. 154(b) by 0 days.

(21) Appl. No.: 10/242,520

(22) Filed: Sep. 12, 2002

(51) Int. Cl.$^7$ ................................. B60N 2/38; B62J 1/00
(52) U.S. Cl. ............................. 297/195.13; 297/195.12; 280/288.4
(58) Field of Search .................. 297/195.12, 195.13; 280/288.4, 220, 202, 291; 224/32, 31, 35, 215, 420

(56) References Cited

U.S. PATENT DOCUMENTS

| | | | | |
|---|---|---|---|---|
| 2,376,713 A | * | 5/1945 | Murrel | 248/214 |
| 2,550,200 A | * | 4/1951 | Murrel | 248/214 |
| 4,305,532 A | * | 12/1981 | Reminger | 224/416 |
| 4,632,453 A | * | 12/1986 | Robbin et al. | 297/243 |
| 4,919,479 A | * | 4/1990 | Loewke et al. | 297/243 |
| 4,969,658 A | * | 11/1990 | Levarek et al. | 280/202 |
| 5,052,704 A | * | 10/1991 | Nauman | 280/202 |
| 5,104,188 A | * | 4/1992 | Jefferson | 297/195.13 |
| 5,800,014 A | * | 9/1998 | Musso, Jr. | 297/243 |
| 6,010,140 A | * | 1/2000 | Guynn | 280/291 |

* cited by examiner

*Primary Examiner*—Peter M. Cuomo
*Assistant Examiner*—Stephen D'Adamo

(57) ABSTRACT

A molded unit is installable upon a bicycle between the existing seat and the handlebars and provides a passenger with a safe and convenient position to ride on the bicycle. The placement of the unit on the bicycle is adjustable to accommodate a wide variety of different passengers. Spacer members, either formed on the unit or provided separately, provide for a proper spacing of the device when installed on standard bicycles. A seat portion provides a contoured seat for the passenger while opposing foot pegs provide for a safe placement of the feet of the passenger. The foot pegs have end stops and a ribbed surface to prevent the feet of the passenger from inadvertently slipping off of the foot pegs. A long securing bolt extends entirely through the foot pegs to reinforce and otherwise strengthen the foot pegs.

18 Claims, 5 Drawing Sheets

SUPPLEMENTAL SEAT DEVICE FOR A BICYCLE

BACKGROUND

1. Field of the Invention

Generally, the invention relates to supplemental seats for placement on a bicycle to provide a passenger with a convenient safe place to ride on the bicycle. More specifically, the invention relates to such supplemental seats which place the seat on the bicycle between the existing primary seat of the bicycle and the handle bars of the bicycle.

2. Description of the Prior Art

Numerous methods exist to provide a secondary seat on a bicycle for a passenger. The art is rich with devices which place the secondary seat in various locations on the bicycle. These locations include on or in front of the handle bars, behind the primary seat and between the primary seat and the handle bars. Those devices which place the secondary seat on or in front of the handle bars are impractical because they do not provide the operator of the bicycle with the ability to maintain control over the passenger and also tend to diminish the operator's control over the bicycle. This is particularly true when the passenger is a child. Those device which place the secondary seat behind the primary seat are also impractical because they also do not provide the operator of the bicycle with the ability to maintain control over the passenger. This is even more of a disadvantage when the passenger is a child due to the fact that the child is then positioned beyond the range of view of the operator. Those devices which place the secondary seat between the primary seat and the handle bars provide a better position for the passenger than the other two alternatives. This is a vastly superior placement position when the passenger is a child then are the other two placement alternative.

Those prior art attempts which place the secondary seat between the primary seat and the handle bars have various deficiencies. Some prior art attempts provide for attachment only to the upper tubular bar extending from beneath the primary seat forward toward the handle bars. This arrangement either requires cutting in to the tubular bar or risks having the supplemental seat rotate during usage. Some prior art attempts provide for attachment to both the upper tubular bar and the lower tubular bar positioned beneath the upper tubular bar. This arrangement typically relies upon either opposing narrow width panels or opposing tubular bars which straddle the upper tubular bar and the lower tubular bar. This arrangement provides for too many locations where the passenger may entangle their legs or feet. This is particularly true when the passenger is a child.

As can be seen various attempts have been made to provide for a supplement seat for placement on a bicycle. These attempts have been less efficient than desired. As such, it may be appreciated that there continues to be a need for a supplemental seat device for a bicycle which places the passenger between the operator of the bicycle and the handle bars where the passenger remains within a field of view of the operator while allowing the operator to maintain control over the passenger for a safe and fun riding experience. The present invention substantially fulfills these needs.

SUMMARY

In view of the foregoing disadvantages inherent in the known types of supplemental seats for bicycles, your applicant has devised a supplemental seat device for bicycles. Applicable bicycles have handle bars, a primary seat, an upper tubular bar extending from a position beneath the primary seat to a position beneath the handle bars and a lower tubular bar positioned below the upper tubular bar. The supplemental seat device provides for secure placement of a seat for a passenger on the bicycle between the handle bars and the primary seat. The supplemental seat device has a seat portion, means to contain the supplemental seat device at the upper tubular bar, means to contain the supplemental seat device at the lower tubular bar, means to provide the passenger with a place for their feet and means to secure the supplemental seat device on the bicycle. The seat portion has a contoured area for contact with the passenger.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a supplement seat device which places a seat for a passenger in a safe and convenient location on an existing bicycle between the primary seat and the handle bars of the bicycle.

Other objects include;

a) to provide for opposing side panels of sufficient longitudinal width to provide for a safe area about a child passenger's feet.

b) to provide for sturdy foot pegs for the child passenger's feet.

c) to provide for foot pegs for the child passenger's feet which have end stops which prevent the feet from slipping outward off of the ends and which encourage the child passenger to maintain proper foot placement.

d) to provide for foot pegs for the child passenger's feet which have ribs therealong which provide a secure placement location for the child passenger's feet.

e) to provide for placement of a long securing bolt through the foot pegs to reinforce and otherwise strengthen the foot pegs.

f) to provide for a recessing of attachment bolts to eliminate protrusions above the exterior surfaces of the side panels to prevent injury to passengers of the bicycle.

g) to provide for opposing side panels which extend substantially an entire length of the seat portion adjacent the seat portion.

h) to provide for a molded unit which has no moving parts following installation.

i) to provide for easy adjustment of a spacial placement of the supplemental seat device on the bicycle relative to the handle bars where a comfortable placement of the passenger's hands on the handle bars may readily occur.

j) to provide for a relatively narrow seat portion where the operator of the bicycle is not unduly inconvenienced during pedaling of the bicycle particularly when the supplemental seat device is not occupied by a passenger.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION

Figure 1:
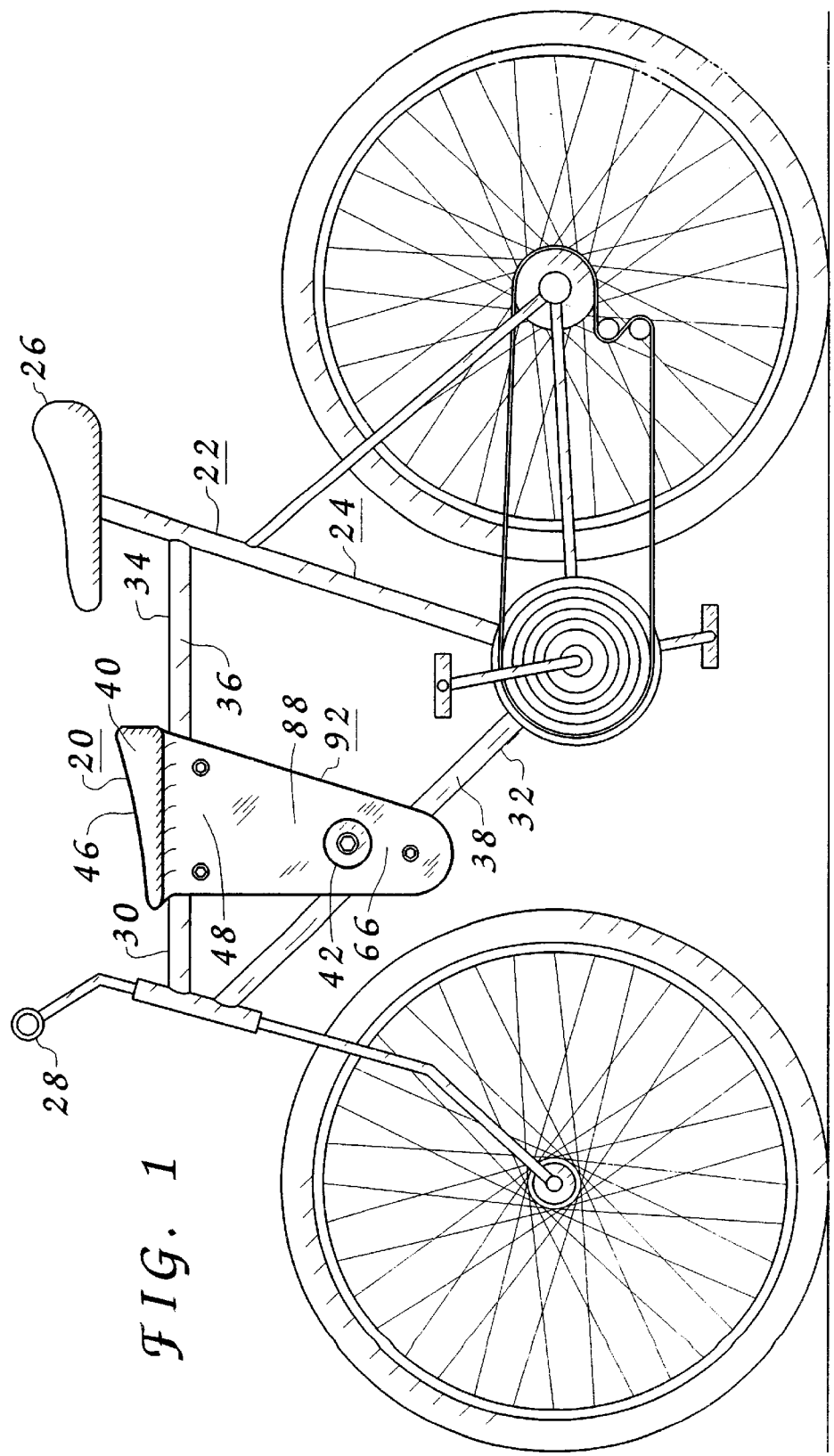
FIG. 1 is a side plan view of a typical bicycle with a supplemental seat device installe thereon.

Many different devices having features of the present invention are possible. The following description describes the preferred embodiment of select features of those devices. These features may be deployed in various combinations to arrive at various desired working configurations of devices.

Reference is hereafter made to the drawings where like reference numerals refer to like parts throughout the various views.

Bicycle

Most bicycles larger than those for small children are applicable to have the present invention installed thereon. Applicable bicycles will have a primary seat and handle bars positioned forward from the primary seat. An upper tubular bar will extend from a position elevationally beneath the handles bars to a position elevationally beneath the primary seat. The upper tubular bar may be generally parallel to the ground or may have an angular offset relative to the ground and will have an upper surface and opposing side surfaces. A lower tubular bar will exist below the upper tubular bar. The lower tubular bar typically will be angularly offset significantly relative to the upper tubular bar and will have opposing side surfaces. The upper and lower tubular bars often will be round in cross section but may have any shape conventionally known for bicycle frames. The above description of upper surface and opposing side surfaces for either the upper tubular bar or the lower tubular bar are not intended to imply any linear juncture therebetween but to define general identifiable areas on the respective bars.

FIG. 1 depicts a supplemental seat device 20 positioned on a bicycle 22 having a frame 24. A primary seat 26 and handle bars 28 are attached relative to frame 24 in spaced relationship. Frame 24 has an upper tubular bar 30 extending from a position beneath handle bars 28 to a position beneath primary seat 26. A lower tubular bar 32 is positioned below upper tubular bar 30. Upper tubular bar 30 has an upper surface 34 and opposing side surfaces 36, only near one shown. Lower tubular bar 32 has opposing side surfaces 38, only near one shown.

Supplemental Seat Device

Supplemental seat devices having features of the present invention will have a seat portion, means to contain the upper tubular bar, means to contain the lower tubular bar, foot placement means, a coupling between the containment of the upper tubular bar and the lower tubular bar and means to secure the supplemental seat device relative to the upper tubular bar and the lower tubular bar. Preferably the supplemental seat device, minus the securing hardware, will be formed by a molding process. Such molding preferably will be in a single piece although it is envisioned to form multiple components which cooperate to form the supplemental seat device. One example of such multiple component construction involves identical side panels and a separate seat portion with suitable containment of the seat portion relative to the opposing side panels following installation.

The supplemental seat device will be positioned on the bicycle during an installation procedure. Following the installation the supplemental seat device will provide a safe and convenient location for a passenger to ride on the bicycle with an operator of the bicycle. The supplemental seat device is ideally suited for use by children who would ride on the bicycle with an operator, preferably an adult. The supplemental seat device also provides for a safe, convenient and comfortable positioning of the feet of the passenger.

FIG. 1 depicts supplemental seat device 20 installed on bicycle 22 and provides for secure placement of a seat portion 40 for use by a passenger, not shown in any of the views. Supplemental seat device 20 straddles upper tubular bar 30 and lower tubular bar 32 of bicycle 22. Supplemental seat device 20 preferably contacts upper surface 34 of upper tubular bar 30. Supplemental seat device 20 contacts side surfaces 36 of upper tubular bar 30 and side surfaces 38 of lower tubular bar 32. Supplemental seat device 20 also has a first foot placement member 42, see FIG. 1, and a second foot placement member 44, see FIG. 3 and FIG. 4. Supplemental seat device 20 does not interfere with normal operation of bicycle 22 even when occupied by a passenger. Preferably supplemental seat device 20 has a plurality of exterior surfaces of sufficient dimension to prevent the legs of the passenger from becoming intertwined with lower tubular bar 32 during use.

Seat Portion

A seat portion has a seat for the passenger to sit on. Preferably the seat will be contoured for the comfort of the passenger. The seat will position the passenger directly above the upper tubular bar and therefore aligned with the center of balance of the bicycle. Preferably the seat portion will be relatively narrow when viewed from above. This arrangement ensures that the operator of the bicycle will be able to pedal the bicycle without undue concern that his or her knees or legs will strike the seat portion. This is particularly important when the operator is operating the bicycle with the supplemental seat device unoccupied.

FIG. 1 through FIG. 4 depict seat portion 40 having a seat 46 for contact with the passenger and having a contour for the comfort of the passenger. Seat portion 40 has a significant length, a sufficient width and a general shape to ensure comfort for the passenger.

Upper Tubular Bar Containment

Means will be provided for the supplemental seat device to contain the upper tubular bar of the bicycle. Preferably this containment will involve straddling the upper tubular bar of the bicycle with a pressure bearing contact with at least the opposing sides of the upper tubular bar and may involve contact with the upper surface of the upper tubular bar. Ideally this containment will involve such pressure bearing contact along a substantial length of the upper tubular bar and preferably will extent substantially the entire length of the seat portion. Preferably means will be provided to ensure proper spacing of the components of the supplemental seat device about the upper tubular bar of the bicycle following the installation.

Figure 2:
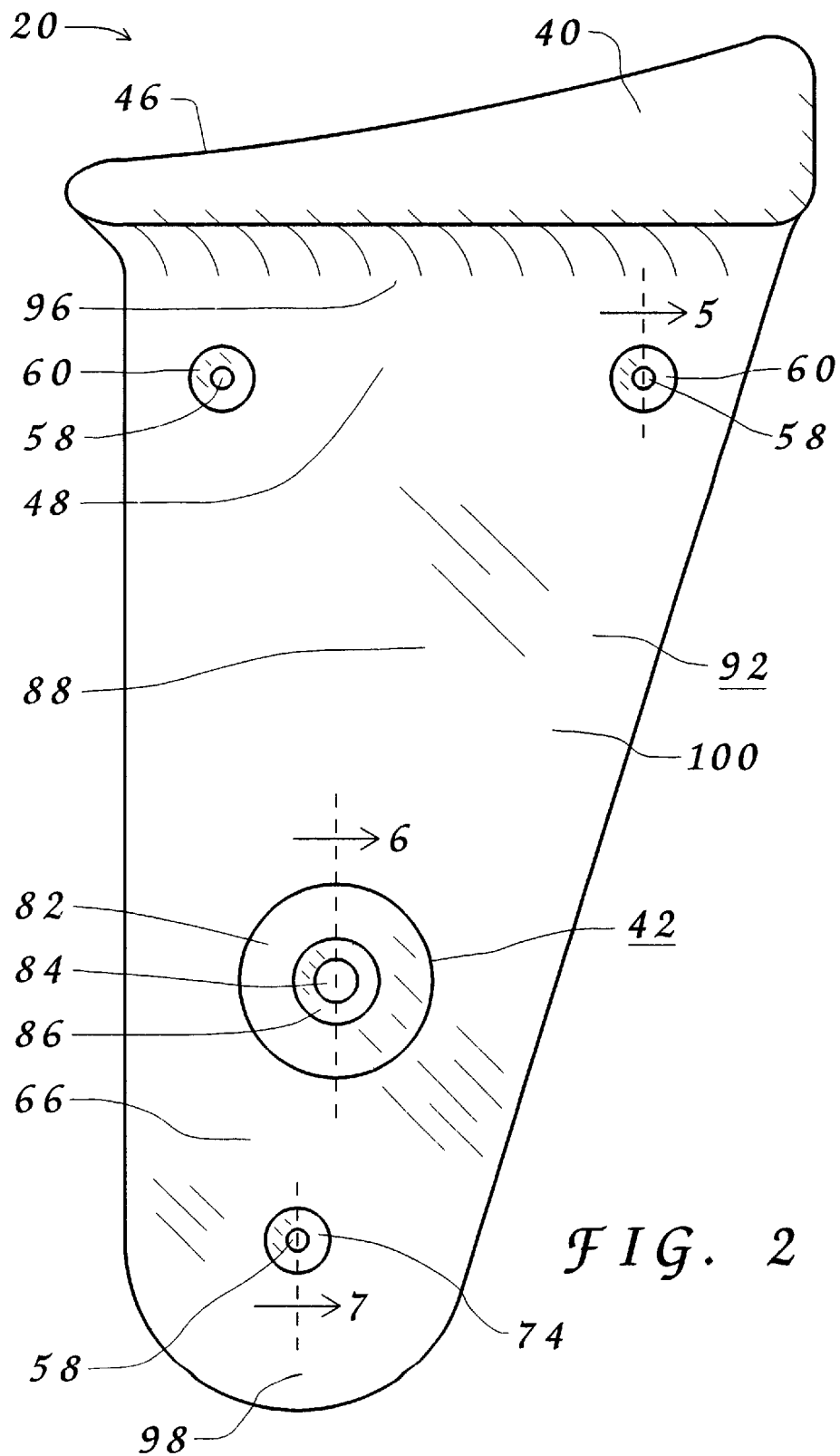
FIG. 2 is a side plan view of the supplemental seat device.
Figure 4:
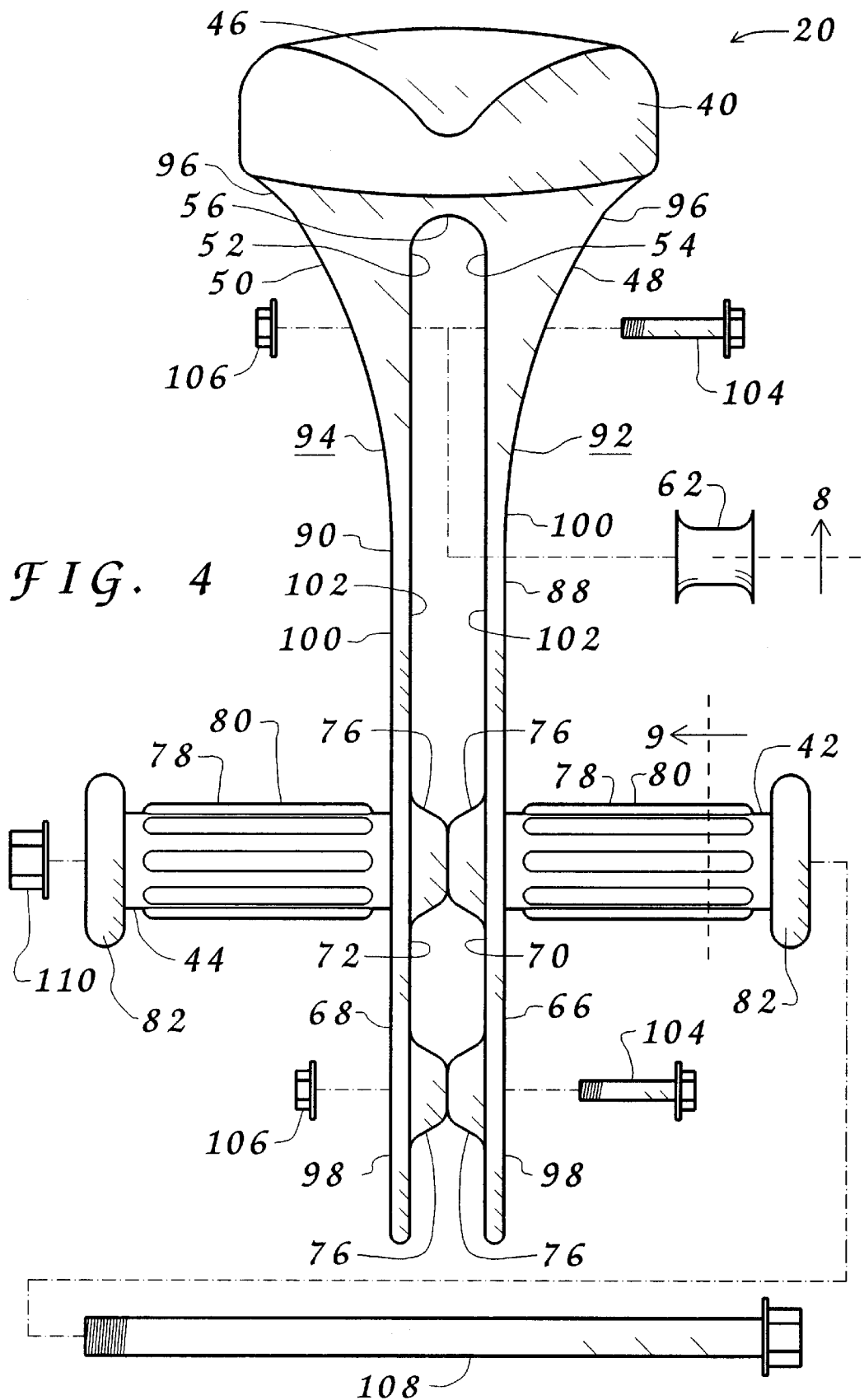
FIG. 4 is a front plan view of the supplemental seat device.
Figure 5:
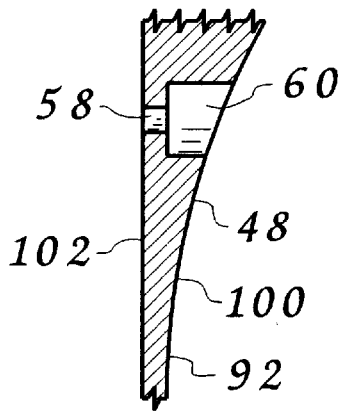
FIG. 5 is a partial sectional view of the first panel only as taken from the section line '5' shown in FIG. 2.
Figure 8:
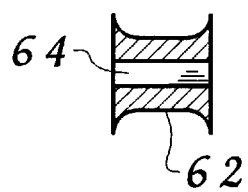
FIG. 8 is a partial sectional view as taken from the section line '8' shown in FIG. 4.
Figure 9:
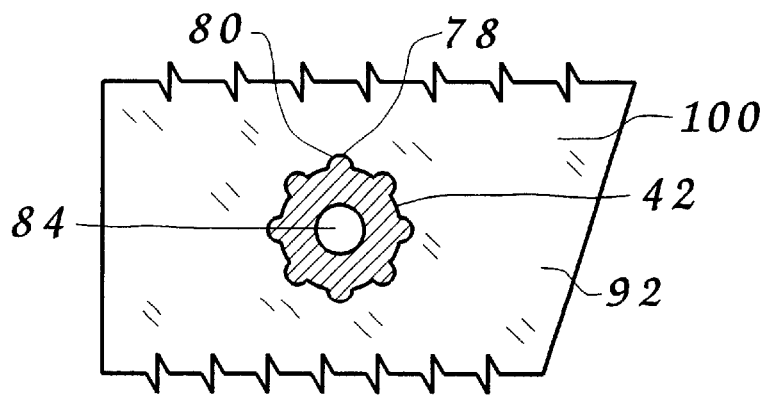
FIG. 9 is a partial sectional view as taken from the section line '9' shown in FIG. 4.

FIG. 1, FIG. 2 and FIG. 4 depict opposing upper tubular bar contact portions 48 and 50, see FIG. 4 for 50, with a placement of supplemental seat device 20 on bicycle 22 shown in FIG. 1. Upper tubular bar contact portions 48 and 50 provide for a containment of upper tubular bar 30 of bicycle 22 following the installation. Contact surfaces 52, 54 and 56, see FIG. 4, are in respective contact with opposing side surfaces 36 and upper surface 34, see FIG. 1, of upper tubular bar 30 following installation of supplemental seat device 20 on bicycle 22. As depicted in FIG. 1 a significant length of upper tubular bar 30 is contained by upper tubular bar contact portions 48 and 50 following installation. Such containment of upper tubular bar 30 occurring along a length nearly matching a length of seat portion 40. As more fully described below mounting hardware acts to trap upper tubular bar 30 relative to upper tubular bar contact portions 48 and 50. To this end a pair of opposing corresponding apertures 58 penetrate each upper tubular bar contact portions 48 and 50, see FIG. 2 and FIG. 5. Preferably any mounting hardware will not extend above the exterior surfaces of the supplemental seat device. To this end each aperture 58 of upper tubular bar contact portion 48 is provided with a recess 60, see FIG. 2 and FIG. 5, in which the mounting hardware will reside following installation. Preferably supplemental seat device 20 will be formed wherein upper tubular bar 30 of bicycle 22 will snugly fit between upper tubular bar contact portions 48 and 50. In order to maintain proper spacing a spacer 62, see FIG. 4 and FIG. 8, is provided which has an aperture 64 therethrough. One spacer 62 would be installed for each corresponding set of apertures 58 between upper tubular bar contact portions 48 and 50.

Lower Tubular Bar Containment

Means will be provided for the supplemental seat device to contain the lower tubular bar of the bicycle. Preferably this containment will involve pressure bearing contact with the opposing sides of the lower tubular bar. Preferably this containment will involve such pressure bearing contact along a substantial length of the lower tubular bar. Preferably means will be provided to ensure proper spacing of the components of the supplemental seat device about the lower tubular bar of the bicycle following the installation.

Figure 7:
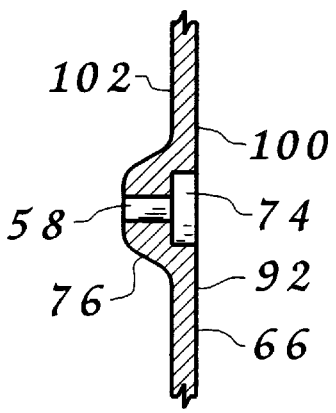
FIG. 7 is a partial sectional view of the first panel only as taken from the section line '7' shown in FIG. 2.

FIG. 1, FIG. 2 and FIG. 4 depict opposing lower tubular bar contact portions 66 and 68, see FIG. 4 for 68, with a placement of supplemental seat device 20 on bicycle 22 shown in FIG. 1. Lower tubular bar contact portions 66 and 68 provide for a containment of lower tubular bar 32 of bicycle 22 following the installation. Contact surfaces 70 and 72, see FIG. 4, are in respective contact with opposing side surfaces 38, see FIG. 1, of lower tubular bar 32 following installation of supplemental seat device 20 on bicycle 22. As depicted in FIG. 1 a significant length of lower tubular bar 32 is contained by lower tubular bar contact portions 66 and 68 following installation. As more fully described below mounting hardware acts to trap lower tubular bar 32 of bicycle 22 relative to lower tubular bar contact portions 66 and 68. To this end opposing corresponding apertures 58 penetrate lower tubular bar contact portions 66 and 68, see FIG. 2 and FIG. 7. Preferably any mounting hardware will not extend above the exterior surfaces of the supplemental seat device. To this end each aperture 58 of lower tubular bar contact portion 66 is provided with a recess 74, see FIG. 2 and FIG. 7, in which the mounting hardware will reside following installation. Preferably supplemental seat device 20 will be formed wherein lower tubular bar 32 of bicycle 22 will snugly fit between lower tubular bar contact portions 66 and 68. In order to maintain proper spacing a spacer 76, see FIG. 4 and FIG. 7, is formed on each lower tubular bar contact portion 66 and 68 with corresponding aperture 58 therethrough. The opposing spacers 76 cooperate to provide for proper spacing between lower tubular bar contact portions 66 and 68 following installation.

Foot Placement

It is necessary to provide means for the passenger to safely, comfortably and conveniently place their feet during use of the supplemental seat device. This is accomplished by providing elongated foot placement members which extend outward on opposing sides of a plane formed by the upper tubular bar and the lower tubular bar of the bicycle. Such extending members may have any desired shape and orientation. Preferably such extending foot placement members will have structures which ensure a true placement of the feet of the passenger without undue concern that the feet will slip off of the extending members either forward or backward relative to the bicycle or off of the ends of the extending members. Depending upon the construction of the extending members it may be desired to reinforce the members to provide for a structural integrity about the extending foot placement members. Preferably the extending foot placement members will provide structures thereon which provide for placement of mounting hardware therethrough which perform a dual function of securing the supplemental seat device to the bicycle while strengthening the foot placement members.

Figure 3:
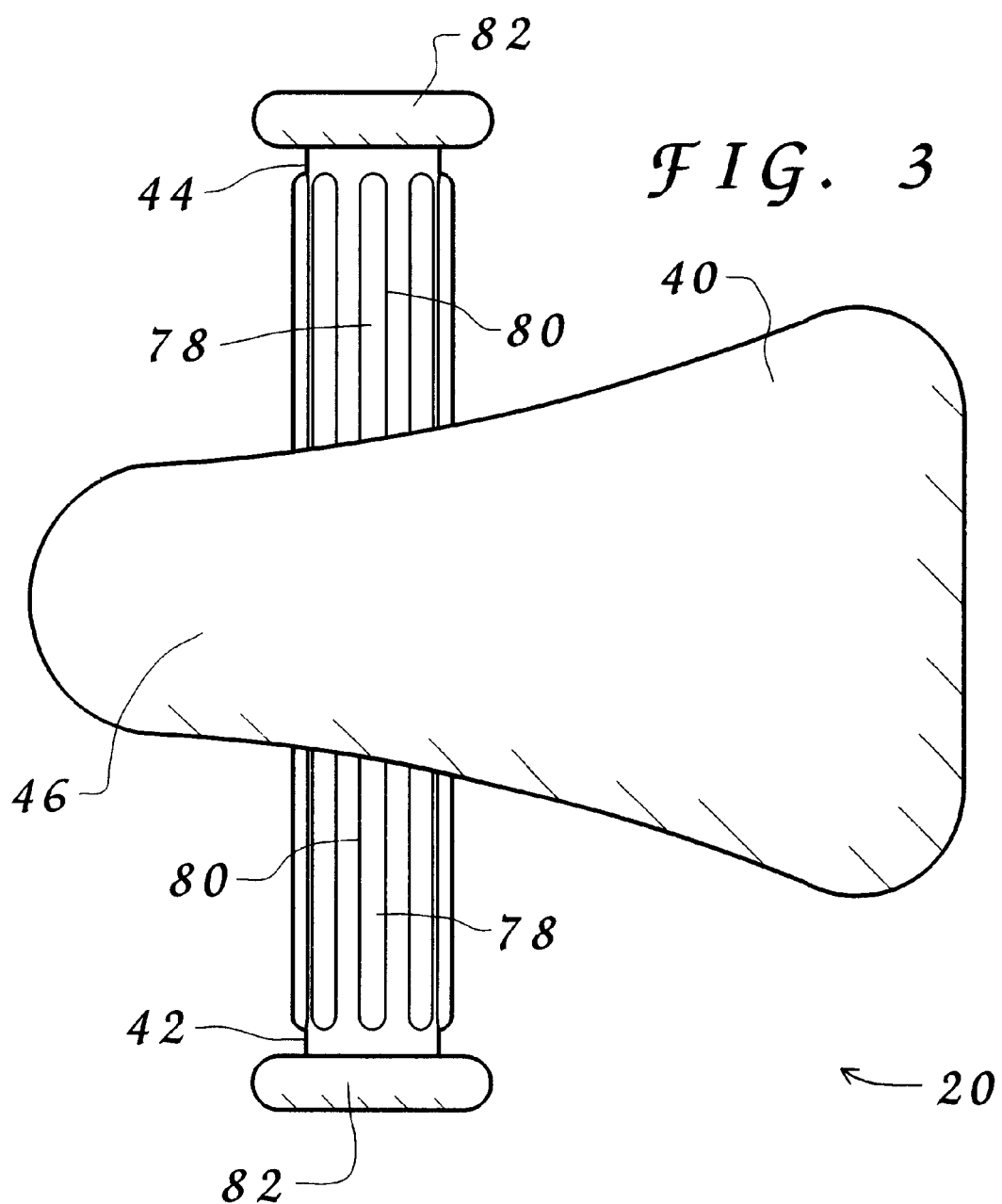
FIG. 3 is a top elevational view of the supplemental seat device.
Figure 6:
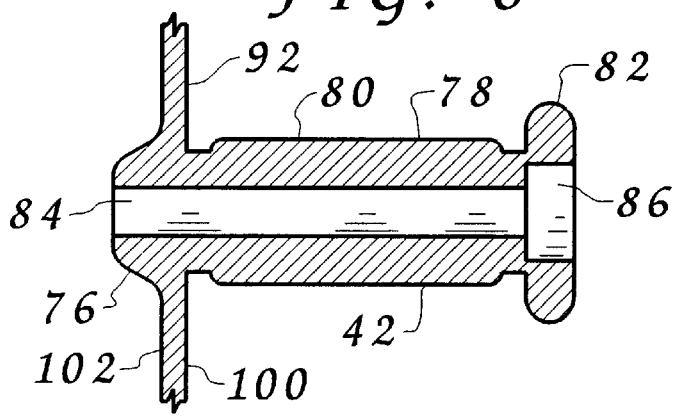
FIG. 6 is a partial sectional view of the first panel only as taken from the section line '6' shown in FIG. 2.

First foot placement member 42 and second foot placement member 44 are depicted in FIG. 3 and FIG. 4 with first foot placement member also shown in FIG. 1, FIG. 2, FIG. 6 and FIG. 9. Each foot placement member 42 and 44 has a foot contact surface 78 which preferably has features, such as raised ribs 80, which ensure a true contact by the feet of the passenger during use. Each foot placement member 42 and 44 preferably has a feature, such as an end stop 82, which ensure that the feet of the passenger do not slip outwardly off of the respective foot placement member 42 or 44. Each end stop 82 has an elevational height greater than an elevational height of the adjacent foot contact surface 78. Each foot placement member 42 and 44 has a longitudinal length which are aligned one with the other. A passageway or channel 84, see FIG. 2, FIG. 6 and FIG. 9, extends through each foot placement member 42 and 44 along their respective longitudinal length. Preferably any mounting hardware will not extend above the exterior surfaces of the supplemental seat device and in this case beyond the extent of end stops 82. To this end each end stop 82 is provided with a recess 86, see FIG. 2 and FIG. 6, aligned with passageway 84 and in which the mounting hardware will reside following installation. In order to maintain proper spacing between first foot placement member 42 and second foot placement member 44 spacer 76, see FIG. 4 and FIG. 6, is formed with passageway 84 therethrough. The opposing spacers 76 cooperate to provide for proper spacing between first foot placement member 42 and second foot placement member 44 following installation.

Coupling Between Upper Tubular Bar and Lower Tubular Bar

Many different structural arrangements may be employed to provide for a coupling of the structures of the upper tubular bar containment and the structures of the lower-tubular bar containment. A coupling portion will be positioned between the upper tubular bar contact portion and the lower tubular bar contact portion. Depending upon the eventual configuration of the supplemental seat device and the manufacturing process utilized it is not necessary that any structural elements or features exist to distinguish the various portions. In a preferred embodiment the upper tubular bar contact portion, the coupling portions, the foot placement members and the lower tubular bar contact portion are contained on opposing side panels which straddle the upper tubular bar and the lower tubular bar of the bicycle following installation. Such opposing side panels are preferred due to the smooth expansive exterior surfaces which are obtainable. As previously discussed the most preferred embodiment is obtainable from a molding process where the entire supplemental seat device, excluding the mounting hardware, is of a single piece. This arrangement provides for an extremely strong, very attractive and very comfortable device which is easy to install on applicable bicycles.

FIG. 1, FIG. 2 and FIG. 4 depict opposing coupling portions 88 and 90, see FIG. 4 for 90, with a placement of supplemental seat device 20 on bicycle 22 shown in FIG. 1. Coupling portions 88 and 90 provide for connection of upper tubular bar contact portions 48 and 50 with lower tubular bar contact portions 66 and 68 respectively. It being noted that it is not necessary for any surfaces of coupling portions 88 and 90 to contact any portion of bicycle 22 following installation.

In the most preferred embodiment, as depicted in the various views, a first panel 92 is formed by upper tubular bar contact portion 48, coupling portion 88 and lower tubular bar contact portion 66 while a second panel 94 is formed by upper tubular bar contact portion 50, coupling portion 90 and lower tubular bar contact portion 68, see FIG. 4. First panel 92 and second panel 94 broaden and mate with seat portion 40, see FIG. 4 at a seat end 96. First panel 92 and second panel 94 become narrower in profile, see FIG. 2, and taper down as extending away from seat portion 40 and terminate in a smooth rounded distal end 98 distal from seat portion 40. First panel 92 and second panel 94 at their respective seat end 96 extend substantially the entire length of seat portion 40. Each panel 92 and 94 has an exterior surface 100 and an interior surface 102, see FIG. 4. Preferably interior surfaces 102 are smooth and parallel with the exception of spacers 76. This provides for ready installation over upper tubular bar 30 and lower tubular bar 32 of bicycle 22 when panels 92 and 94 are spread slightly. First foot placement member 42 and second foot placement member 44 extend from first panel 92 and second panel 94 respectively. First panel 92 and second panel 94 have the previously disclosed apertures 58 and passageway 84 extending therethrough.

Securing

It is a requirement that the supplemental seat device be secured to the bicycle in a manner that ensures that the supplemental seat device will not shift or otherwise move about on the bicycle following the installation. Various securing methods are known in the art for such general securement and many of these methods may be employed with the present invention. Preferably the securing method selected will apply a binding pressure about the supplemental seat device to engage both the upper tubular bar and the lower tubular bar of the bicycle. In the most preferred embodiment depicted in the various views a plurality of bolt assemblies are employed for the securement utilizing such binding pressure between the first panel and the second panel in close proximity to the eventual positions of the upper tubular bar and the lower tubular bar of the bicycle following installation. It is preferred that bolt recess means provide for the securing hardware to reside at or below the exterior surfaces of the supplemental seat device to prevent exposure of such potentially dangerous structures. It is preferred that at least two bolt assemblies be used in spaced orientation at the upper tubular bar contact portion of the supplemental seat device and on the same side of the upper tubular bar of the bicycle following installation. It is preferred that at least two spaced bolt assemblies be used in spaced orientation at or near the lower tubular bar contact portion of the supplemental seat device where the lower tubular bar of the bicycle is positioned therebetween following the installation. In the most preferred embodiment a large and strong bolt is positioned through first foot placement member and second foot placement member to reinforce these structures for maximum strength as well as providing the desired binding pressure.

Supplemental seat devices having features of the present invention will be capable of placement adjustment on the bicycle upon which it is installed. This placement adjustment includes that adjustment which provides for the device to be positioned closer to the handle bars of the bicycle or further away from the handle bars of the bicycle depending upon the size of the passenger. Ideally the passenger will hold on to the handle bars of the bicycle while riding on the bicycle for safety reasons. The adjustment provides for comfortable placement of the device specific to the preferences of the operator and passenger.

FIG. 4 depicts arrangement of the various mounting hardware about supplemental seat device 20. It being understood that such securement would occur following placement of supplemental seat device 20 on bicycle 22, see FIG. 1. Such securement will utilize two opposing sets of apertures 58 near seat end 96 of supplemental seat device 20, passageways 84 through first foot placement member 42 and second foot placement member 44 and opposing set of apertures 58 near distal end 98 of supplemental seat device 20. A bolt 104 is positioned through each opposing set of apertures 58 near seat end 96 following placement of spacer 62 between panels 92 and 94 and a nut 106 is secured respectively thereto. As shown in FIG. 2 apertures 58 are positioned in close proximity to the edges of panels 92 and 94 so that placement of spacer 62 may easily occur relative to apertures 58 during the installation process. In this manner the desired binding pressure is applied to upper tubular bar 30 of bicycle 22. Bolt 104 is positioned though opposing set of apertures 58 near distal end 98 and nut 106 is secured thereto. A bolt 108 is positioned through passageways 84 of foot placement members 42 and 44 and a nut 110 is secured thereto. In this manner the desired binding pressure is applied to lower tubular bar 32 of bicycle 22. It being noted that bolts 104 and 108 and nuts 106 and 110 fit within their respective recesses 60, 74 and 86 following installation. Spacers 62 and spacers 76 provide for maintenance of a proper spacing between panels 92 and 94 following installation. If desired caps, as conventionally known in the art and not shown, can close off recesses 60, 74 and 86 following installation.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A supplemental seat device for a bicycle, the bicycle having handle bars, a primary seat, an upper tubular bar extending from a position beneath the primary seat to a position beneath the handle bars and a lower tubular bar positioned below the upper tubular bar, the supplemental seat device to provide for secure placement of a seat for a passenger on the bicycle between the handle bars of the bicycle and the primary seat of the bicycle, the supplemental seat device comprising:

a) a seat portion having a contoured area for contact with the passenger;
   b) upper tubular bar containment means to provide for containing a portion of the upper tubular bar of the bicycle following an installation of the supplemental seat device on the bicycle;
   c) lower tubular bar containment means to provide for containing a portion of the lower tubular bar of the bicycle following the installation of the supplemental seat device on the bicycle and wherein the lower tubular bar containment means comprises opposing side panels, each of the side panels having an exterior surface and an interior surface and wherein the interior surface of at least one of the side panels has a protrusion extending therefrom wherein a contact occurs between the side panels;
   d) foot placement means to provide the passenger with positions to place their feet following the installation of the supplemental seat device on the bicycle;
   e) securing means to provide for securing the supplemental seat device following the installation of the supplemental seat device on the bicycle.

2. The supplemental seat device defined in claim 1 wherein the foot placement means further comprises:

a) a first foot placement member comprising:
      1) a foot contact surface having an elevation;
      2) an end stop having an elevation;
      and wherein the elevation of the end stop is greater than the elevation of the foot contact surface;
   b) a second foot placement member comprising:
      1) a foot contact surface having an elevation;
      2) an end stop having an elevation;
      and wherein the elevation of the end stop is greater than the elevation of the foot contact surface.

3. The supplemental seat device defined in claim 1 wherein the upper tubular bar containment means further provides for a contact between the supplemental seat device and an upper surface of the upper tubular bar of the bicycle following the installation of the supplemental seat device on the bicycle and wherein the securing means further comprises a securement member positioned on the supplemental seat device immediately below the upper tubular bar of the bicycle following the installation of the supplemental seat device on the bicycle.

4. The supplemental seat device defined in claim 1 wherein the supplemental seat device further has a plurality of exterior surfaces and wherein the securing means further comprises a plurality of bolt assemblies and wherein the supplemental seat device further comprises bolt recess means to provide for positioning each of the bolt assemblies wherein the bolt assemblies reside below the exterior surfaces of the supplemental seat device.

5. The supplemental seat device defined in claim 1 wherein the upper tubular bar containment means further comprises opposing side panels with corresponding apertures therethrough and wherein the opposing side panels have a lateral edge and wherein the securing means further comprises a bolt assembly for positioning within the corresponding apertures of the opposing side panels and wherein the corresponding apertures are positioned on the side panels in close proximity to the lateral edge.

6. The supplemental seat device defined in claim 1 wherein the passenger on the bicycle further comprises a child.

7. A supplemental seat device for a bicycle, the bicycle having handle bars, a primary seat, an upper tubular bar extending from a position beneath the primary seat to a position beneath the handle bars and a lower tubular bar positioned below the upper tubular bar, the supplemental seat device to provide for secure placement of a seat for a passenger on the bicycle between handle bars of the bicycle and the primary seat of the bicycle, the supplemental seat device comprising:

a) an upper tubular bar contact portion to provide for contact with the upper tubular bar of the bicycle;
   b) a lower tubular bar contact portion to provide for contact with the lower tubular bar of the bicycle;
   c) a coupling portion to provide for spanning the upper tubular bar contact portion and the lower tubular bar contact portion;
   d) a seat portion positioned above the upper tubular bar contact portion, the seat portion having a contoured area for contact with the passenger;
   e) a left foot portion positioned in close proximity to the coupling portion and extending outward, the left foot portion to provide for placement of a left foot of the passenger and wherein the left foot portion further comprises a longitudinal length and a channel extending therethrough along the longitudinal length;
   f) a right foot portion positioned in close proximity to the coupling portion and extending outward away from the left foot portion, the right foot portion to provide for placement of a right foot of the passenger and wherein the right foot portion further comprises a longitudinal length and a channel extending therethrough along the longitudinal length;

g) securing means to provide for applying a binding pressure between the supplemental seat device and the lower tubular bar of the bicycle following an installation of the supplemental seat device on the bicycle and wherein the securing means further comprises a bolt assembly positioned through the channel of the left foot portion and through the channel of the right foot portion following the installation of the supplemental seat device on the bicycle.

8. The supplemental seat device defined in claim 7 wherein the left foot portion and the right foot portion are in contact following the installation of the supplemental seat device on the bicycle.

9. The supplemental seat device defined in claim 7 wherein the coupling portion further comprises a first portion and a second portion, the first portion of the coupling extending from the upper tubular bar contact portion, the second portion of the coupling extending from the upper tubular bar contact portion, the first portion of the coupling portion spaced from the second portion of the coupling portion and wherein the lower tubular bar contact portion further comprises a first portion and a second portion, the first portion of the lower tubular bar contact portion extending from the first portion of the coupling portion, the second portion of the lower tubular bar contact portion extending from the second portion of the coupling portion, the first portion of the lower tubular bar contact portion spaced from the second portion of the lower tubular bar contact portion.

10. The supplemental seat device defined in claim 9 wherein the first portion of the coupling portion and the first portion of the lower tubular bar contact portion further comprise a single panel member and wherein the second portion of the coupling portion and the second portion of the lower tubular bar contact portion further comprise a single panel member.

11. A supplemental seat device for a bicycle, the bicycle having handle bars, a primary seat, an upper tubular bar extending from a position beneath the primary seat to a position beneath the handle bars and a lower tubular bar positioned below the upper tubular bar, the supplemental seat device to provide for secure placement of a seat for a passenger on the bicycle between handle bars of the bicycle and the primary seat of the bicycle, the supplemental seat device comprising:

a) a seat portion having a contoured area for contact with the passenger;

b) a first side panel extending from the seat portion, the first side panel of sufficient length to span from the upper tubular bar of the bicycle to the lower tubular bar of the bicycle following an installation of the supplemental seat device on the bicycle;

c) a second side panel extending from the seat portion, the second side panel spaced from the first side panel and generally parallel to the first side panel, the second side panel of sufficient length to span from the upper tubular bar of the bicycle to the lower tubular bar of the bicycle following the installation of the supplemental seat device on the bicycle;

d) a first foot placement member extending from the first side panel away from the second side panel, the first foot placement member to provide for placement of a first foot of the passenger;

e) a second foot placement member extending from the second side panel away from the first side panel, the second foot placement member to provide for placement of a second foot of the passenger;

f) securing means to provide for applying a binding pressure from the first panel to the second panel wherein the first panel and the second panel engage the lower tubular bar of the bicycle following the installation of the supplemental seat device on the bicycle.

12. The supplemental seat device defined in claim 11 wherein the first side panel extends substantially an entire length of the seat portion and wherein the second side panel extends substantially the entire length of the seat portion.

13. The supplemental seat device defined in claim 11 wherein the first side panel further comprise a seat end in close proximity to the seat portion and a distal end distal from the seat portion and wherein the second panel further comprises a seat at end in close proximity to the seat portion and a distal end distal from the seat portion and wherein the first side panel has a width which tapers down from the seat end to the distal end and wherein the second side panel has a width which tapers down from the seat end to the distal end.

14. The supplemental seat device defined in claim 11 further comprising secondary securing means to provide for applying a binding pressure from the first panel to the second panel wherein the first panel and the second panel engage the upper tubular bar of the bicycle following the installation of the supplemental seat device on the bicycle.

15. The supplemental seat device defined in claim 11 further comprising stabilization means to provide for fixedly positioning the first panel and the second panel at approximately a mid position therealong utilizing a contracting pressure therebetween following the installation of the supplemental seat device on the bicycle.

16. The supplemental seat device defined in claim 11 wherein the first foot placement member further comprises a passageway therethrough and through the first side parel and wherein the second foot placement member further comprises a passageway therethrough and through the second side panel and wherein the supplemental seat device further comprises a foot placement securing assembly extending through the passageway of the first foot placement member and through the passageway of the second foot placement member following the installation of the supplemental seat device on the bicycle.

17. The supplemental seat device defined in claim 11 wherein the securing means further comprises an aperture in the first side panel, an aperture in the second side panel and a securing assembly extending through the aperture of the first side panel and through the aperture of the second side panel and wherein the securing assembly resides below the lower tubular bar of the bicycle following the installation of the supplemental seat device on the bicycle.

18. The supplemental seat device defined in claim 11 wherein the seat portion, the first side panel, the second side panel, the first foot placement member and the second foot placement member are formed by a molding process in a single piece.

* * * * *